(12) United States Patent
van Diggelen et al.

(10) Patent No.: US 7,245,255 B2
(45) Date of Patent: Jul. 17, 2007

(54) METHOD AND APPARATUS FOR DETERMINING ABSOLUTE TIME-OF-DAY IN A MOBILE-ASSISTED SATELLITE POSITIONING SYSTEM

(75) Inventors: Frank van Diggelen, San Jose, CA (US); Charles Abraham, Los Gatos, CA (US)

(73) Assignee: Global Locate, Inc

( * ) Notice: Subject to any disclaimer, the term of this patent is extended or adjusted under 35 U.S.C. 154(b) by 304 days.

(21) Appl. No.: 10/801,490

(22) Filed: Mar. 16, 2004

(65) Prior Publication Data

US 2005/0206559 A1   Sep. 22, 2005

(51) Int. Cl.
G01S 5/14 (2006.01)
G04G 5/00 (2006.01)
(52) U.S. Cl. .................................. 342/357.09
(58) Field of Classification Search ........... 342/357.09, 342/357.06, 357.12, 357.15, 357.05
See application file for complete search history.

(56) References Cited

U.S. PATENT DOCUMENTS 6,215,442 B1   4/2001  Sheynblat et al.
6,417,801 B1 *  7/2002  van Diggelen ......... 342/357.09
6,430,415 B1    8/2002  Agashe et al.
6,510,387 B2 *  1/2003  Fuchs et al. ........... 342/357.06

* cited by examiner

Primary Examiner—Thomas H. Tarcza
Assistant Examiner—Fred H. Mull
(74) Attorney, Agent, or Firm—Moser IP Law Group

(57) ABSTRACT

A method and apparatus for determining time-of-day in a mobile receiver is described. In one example, expected pseudoranges to a plurality of satellites are obtained. The expected pseudoranges are based on an initial position of the mobile receiver and an initial time-of-day. Expected line-of-sight data to said plurality of satellites is also obtained. Pseudoranges from said mobile receiver to said plurality of satellites are measured. Update data for the initial time-of-day is computed using a mathematical model relating the pseudoranges, the expected pseudoranges, and the expected line-of-sight data. The expected pseudoranges and the expected line-of-sight data may be obtained from acquisition assistance data transmitted to the mobile receiver by a server. Alternatively, the expected pseudoranges may be obtained from acquisition assistance data, and the expected line-of-sight data may be computed by the mobile receiver using stored satellite trajectory data, such as almanac data.

41 Claims, 5 Drawing Sheets

METHOD AND APPARATUS FOR DETERMINING ABSOLUTE TIME-OF-DAY IN A MOBILE-ASSISTED SATELLITE POSITIONING SYSTEM

BACKGROUND OF THE INVENTION

1. Field of the Invention

The present invention generally relates to satellite position location systems and, more particularly, to determining absolute time-of-day in a mobile-assisted satellite positioning system.

2. Description of the Related Art

Global Positioning System (GPS) receivers use measurements from several satellites to compute position. GPS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver.

More specifically, each GPS signal available for commercial use utilizes a direct sequence spreading signal defined by a unique pseudo-random noise (PN) code (referred to as the coarse acquisition (C/A) code) having a 1.023 MHz spread rate. Each PN code bi-phase modulates a 1575.42 MHz carrier signal (referred to as the L1 carrier) and uniquely identifies a particular satellite. The PN code sequence length is 1023 chips, corresponding to a one millisecond time period. One cycle of 1023 chips is called a PN frame or epoch.

GPS receivers determine the time delays between transmission and reception of the signals by comparing time shifts between the received PN code signal sequence and internally generated PN signal sequences. These measured time delays are referred to as "sub-millisecond pseudoranges", since they are known modulo the 1 millisecond PN frame boundaries. By resolving the integer number of milliseconds associated with each delay to each satellite, then one has true, unambiguous, pseudoranges. A set of four pseudoranges together with a knowledge of absolute times of transmission of the GPS signals and satellite positions in relation to these absolute times is sufficient to solve for the position of the GPS receiver. The absolute times of transmission (or reception) are needed in order to determine the positions of the GPS satellites at the times of transmission and hence to compute the position of the GPS receiver.

Accordingly, each of the GPS satellites broadcasts a model of satellite orbit and clock data known as the satellite navigation message. The satellite navigation message is a 50 bit-per-second (bps) data stream that is modulo-2 added to the PN code with bit boundaries aligned with the beginning of a PN frame. There are exactly 20 PN frames per data bit period (20 milliseconds). The satellite navigation message includes satellite-positioning data, known as "ephemeris" data, which identifies the satellites and their orbits, as well as absolute time information (also referred to herein as "GPS time" or "time-of-day") associated with the satellite signal. The absolute time information is in the form of a second of the week signal, referred to as time-of-week (TOW). This absolute time signal allows the receiver to unambiguously determine a time tag for when each received signal was transmitted by each satellite.

GPS satellites move at approximately 3.9 km/s, and thus the range of the satellite, observed from the earth, changes at a rate of at most ±800 m/s. Absolute timing errors result in range errors of up to 0.8 m for each millisecond of timing error. These range errors produce a similarly sized error in the GPS receiver position. Hence, absolute time accuracy of 10 ms is sufficient for position accuracy of approximately 10 m. Absolute timing errors of much more than 10 ms will result in large position errors, and so typical GPS receivers have required absolute time to approximately 10 milliseconds accuracy or better.

Another time parameter closely associated with GPS positioning is the sub-millisecond offset in the time reference used to measure the sub-millisecond pseudorange. This offset affects all the measurements equally, and for this reason it is known as the "common mode error". The common mode error should not be confused with the absolute time error. As discussed above, an absolute time error of 1 millisecond leads to range errors of up to 0.8 meters while an absolute time error of 1 microsecond would cause an almost unobservable range error of less than 1 millimeter. A common mode error of 1 microsecond, however, results in a pseudorange error of 1 microsecond multiplied by the speed of light (i.e., 300 meters). Common mode errors have a large effect on pseudorange computations, and it is, in practice, very difficult to calibrate the common mode error. As such, traditional GPS receivers treat the common mode error as an unknown that must be solved for, along with position, once a sufficient number of pseudoranges have been measured at a particular receiver.

In some GPS applications, the signal strengths of the satellite signals are so low that either the received signals cannot be processed, or the time required to process the signals is excessive. As such, to improve the signal processing, a GPS receiver may receive assistance data from a network to assist in satellite signal acquisition and/or processing. For example, the GPS receiver may be integrated within a cellular telephone and may receive the assistance data from a server using a wireless communication network. This technique of providing assistance data to a remote receiver has become known as "Assisted-GPS" or A-GPS.

One type of assistance data that may be provided to a GPS receiver is referred to in the art as "acquisition assistance data." The acquisition assistance data is configured to aid the GPS receiver in acquiring satellite signals. The acquisition assistance data typically includes estimated range and range derivative data from satellites to the GPS receiver. The acquisition assistance data is valid for an assumed position of the GPS receiver at an assumed time-of-day. An exemplary format for acquisition assistance data for use within location services of a global system for mobile communications (GSM) network is described in ETSI TS 101 527 (referred to as GSM 4.31), which is incorporated by reference herein in its entirety. Typically, the assumed position of the GPS receiver is known only at the entity providing the acquisition assistance data, and not at the GPS receiver itself.

In some A-GPS systems, the wireless communication network is not synchronized to GPS time. Such non-synchronized networks include time division multiple access (TDMA) networks, such as GSM networks, universal mobile telecommunications system (UMTS) networks, North American TDMA networks (e.g., IS-136), and personal digital cellular (PDC) networks. In such systems, the GPS receiver cannot compute time-of-day to the necessary accuracy without receiving and decoding TOW information from the satellites signals. In low signal-to-noise ratio environments, TOW information is difficult, if not impossible, to decode. Without accurate time-of-day information, the GPS receiver cannot provide an accurate time-tag for its measurements, thereby deleteriously affecting the accuracy of the position computed by the network.

Accordingly, there exists a need in the art for a method and apparatus that determines time-of-day using acquisition-assistance data without receiving absolute time information from the satellite signals and without initial position information from the provider of the acquisition assistance.

SUMMARY OF THE INVENTION

A method and apparatus for determining time-of-day in a mobile receiver is described. In one embodiment, expected pseudoranges to a plurality of satellites are obtained. The expected pseudoranges are based on an initial position of the mobile receiver and an initial time-of-day. Expected line-of-sight data to said plurality of satellites is also obtained. Pseudoranges from said mobile receiver to said plurality of satellites are measured. Update data for the initial time-of-day is computed using a mathematical model relating the pseudoranges, the expected pseudoranges, and the expected line-of-sight data. In one embodiment of the invention, the expected pseudoranges and the expected line-of-sight data are obtained from acquisition assistance data transmitted to the mobile receiver by a server. In another embodiment, the expected pseudoranges may be obtained from acquisition assistance data, and the expected line-of-sight data may be computed by the mobile receiver using stored satellite trajectory data, such as almanac data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE INVENTION

Figure 1:
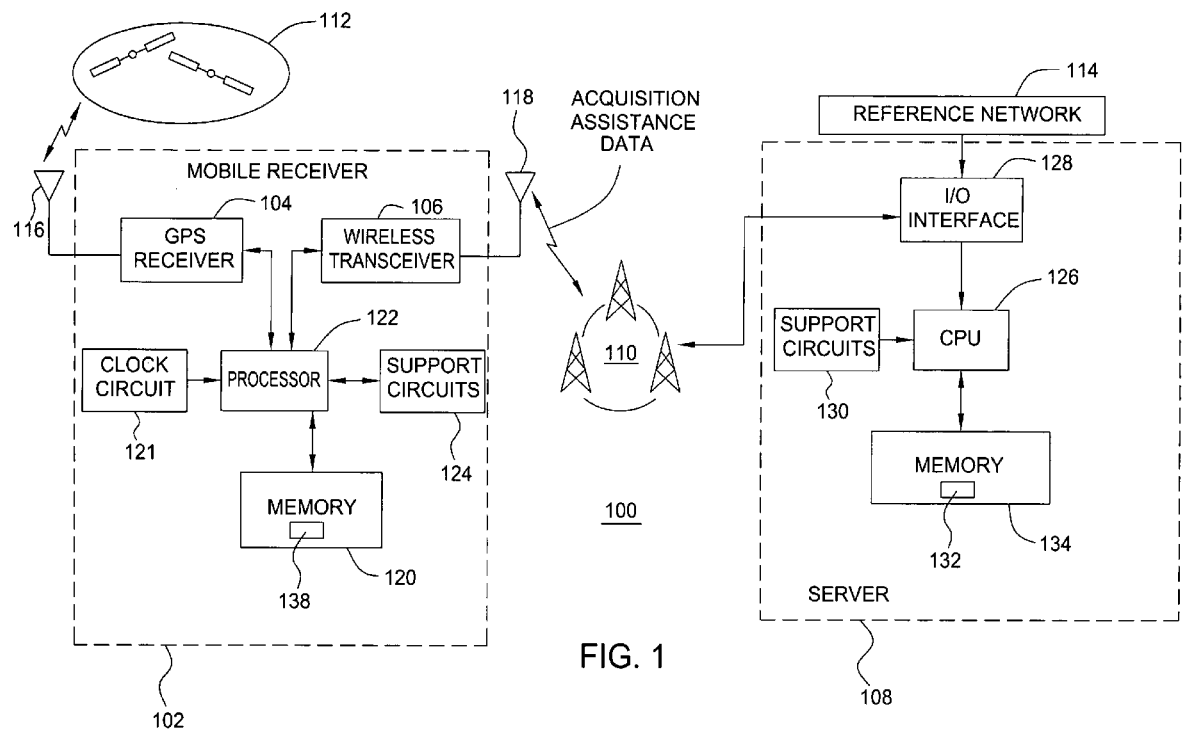
FIG. 1 is a block diagram depicting an exemplary embodiment of a position location system.

FIG. 1 is a block diagram depicting an exemplary embodiment of a position location system 100. The system 100 comprises a mobile receiver 102 in communication with a server 108 via a wireless communication network 110. For example, the server 108 may be disposed in a serving mobile location center (SMLC) of the wireless communication network 110. The mobile receiver 102 obtains satellite measurement data with respect to a plurality of satellites 112 (e.g., pseudoranges). The server 108 obtains satellite navigation data for at least the satellites 112 (e.g., orbit trajectory information, such as ephemeris). Position information for the mobile receiver 102 is computed using the satellite measurement data and the satellite navigation data. Notably, the mobile receiver 102 sends the satellite measurement data to the server 108 along with a time-tag, and the server 108 locates position of the mobile receiver 102 (known as an "MS-assisted" configuration). The server 108 transmits satellite signal acquisition assistance data ("acquisition assistance data") to the mobile receiver 102 upon request.

The server 108 illustratively comprises an input/output (I/O) interface 128, a central processing unit (CPU) 126, support circuits 130, and a memory 134. The CPU 126 is coupled to the memory 134 and the support circuits 130. The memory 134 may be random access memory, read only memory, removable storage, hard disc storage, or any combination of such memory devices. The support circuits 130 include conventional cache, power supplies, clock circuits, data registers, I/O interfaces, and the like to facilitate operation of the server 108. The processes and methods described herein may be implemented using software 132 stored in the memory 134 for execution by the CPU 126. Alternatively, the server 108 may implement such processes and methods in hardware or a combination of software and hardware, including any number of processors independently executing various programs and dedicated hardware, such as application specific integrated circuits (ASICs), field programmable gate arrays (FPGAs), and the like.

The I/O interface 128 is configured to receive data, such as satellite measurement data collected by the mobile receiver 102, from the wireless network 110. In addition, the I/O interface 128 is configured to receive satellite navigation data, such as ephemeris for at least the satellites 112, from an external source, such as a network of tracking stations ("reference network 114"). The reference network 114 may include several tracking stations that collect satellite navigation data from all the satellites in the constellation, or a few tracking stations, or a single tracking station that only collects satellite navigation data for a particular region of the world. An exemplary system for collecting and distributing ephemeris is described in commonly-assigned U.S. Pat. No. 6,411,892, issued Jun. 25, 2002, which is incorporated by reference herein in its entirety.

The server 108 uses the collected satellite navigation data to compute acquisition assistance data for the mobile receiver 102. Acquisition assistance data may be used to assist the mobile receiver 102 in acquiring satellite signals for obtaining satellite measurement data. In accordance with the invention, the acquisition assistance data is also used by the mobile receiver 102 to determine time-of-day for providing an accurate time-tag associated with the satellite measurement data. Exemplary embodiments of processes for determining time-of-day using acquisition assistance data are described below.

The acquisition assistance data is defined with respect to an assumed position of the mobile receiver 102 ("initial position") and an assumed time-of-day ("initial time-of-day"). The server 102 may obtain an initial position of the mobile receiver 102 using various position estimation techniques known in the art, including use of transitions between base stations of the wireless communication network 110, use of a last known location of the mobile receiver 102, use of a location of a base station in communication with the mobile receiver 102, use of a location of the wireless communication network 110 as identified by a network ID, or use of a location of a cell site of the wireless communication network 110 in which the mobile receiver 102 is operating as identified by a cell ID. The initial time-of-day is a coarse estimate of the GPS time at which the initial position was obtained, and hence provides a time-tag for the validity of the acquisition assistance data. For example, as defined in GSM 4.31, the initial time-of-day is provided with an 80 millisecond resolution.

The acquisition assistance data includes estimated range and range-derivative data from the satellites 112 to the initial position of the mobile receiver 102 at the initial time-of-day. For example, the acquisition assistance data may comprise one or more of expected pseudorange data, expected pseudorange rate data (i.e., Doppler data), expected pseudorange acceleration data, and expected line-of-sight data. The acquisition assistance data may also include one or more uncertainties for the expected pseudorange, pseudorange rate, and pseudorange acceleration. The expected line-of-sight data may include expected satellite azimuth and elevation angles that define expected line-of-sight vectors from the initial position to the satellites 112. The acquisition assistance data may also include data indicative of the initial time-of-day upon which the acquisition assistance data is based. Exemplary processes for forming pseudorange models as acquisition assistance data are described in commonly-assigned U.S. Pat. No. 6,453,237, issued Sep. 17, 2002, which is incorporated by reference herein in its entirety.

An exemplary format for acquisition assistance data, as described in GSM 4.31, is shown below in Table 1. Notably, the acquisition assistance data defined in GSM 4.31 may include a satellite vehicle identifier (SVID), zeroth and first order Doppler terms, a Doppler uncertainty, a code phase (i.e., an expected pseudorange), an integer code phase, a code phase search window, and expected azimuth and elevation data. The range of values, number of bits for representing the possible values, and the resolution of the values are shown below in Table 1 for each of the parameters.

TABLE 1

| Parameter | Range | Bits | Resolution |
|---|---|---|---|
| SVID/PRNID | 1–64 (0–63) | 6 | |
| Doppler ($0^{th}$ order term) | −5,120 Hz to 5,117.5 Hz | 12 | 2.5 Hz |
| Doppler ($1^{st}$ order term) | −1–0.5 | 6 | |
| Doppler Uncertainty | 12.5 Hz–200 Hz [$2^{-n}$(200) Hz, n = 0–4] | 3 | |
| Code Phase | 0–1022 chips | 10 | 1 chip |
| Integer Code Phase | 0–19 | 5 | 1 C/A period |
| GPS Bit number | 0–3 | 2 | |
| Code Phase Search Window | 1–192 chips | 4 | |
| Azimuth | 0–348.75 deg | 5 | 11.25 deg |
| Elevation | 0–78.75 deg | 3 | 11.25 deg |

The mobile receiver 102 illustratively comprises a GPS receiver 104, a wireless transceiver 106, a processor 122, support circuits 124, a memory 120, and a clock circuit 121. The GPS receiver 104 receives satellite signals from the satellites 112 using an antenna 116. The GPS receiver 104 may comprise an assisted-GPS receiver, such as that described in U.S. Pat. No. 6,453,237. The wireless transceiver 106 receives a wireless signal from the wireless communication network 110 via an antenna 118. The GPS receiver 104 and the wireless transceiver 106 may be controlled by the processor 122. The clock circuit 121 may be used to track time-of-day and may comprise, for example, a real-time clock.

The processor 122 may comprise a microprocessor, instruction-set processor (e.g., a microcontroller), or like type processing element known in the art. The processor 122 is coupled to the memory 120 and the support circuits 124. The memory 120 may be random access memory, read only memory, removable storage, hard disc storage, or any combination of such memory devices. The support circuits 124 include conventional cache, power supplies, clock circuits, data registers, I/O interfaces, and the like to facilitate operation of the mobile receiver 102. The processes and methods described herein may be implemented using software 138 stored in the memory 120 for execution by the processor 122. Alternatively, the mobile receiver 102 may implement such processes and methods in hardware or a combination of software and hardware, including any number of processors independently executing various programs and dedicated hardware, such as ASICs, FPGAs, and the like.

Figure 2:
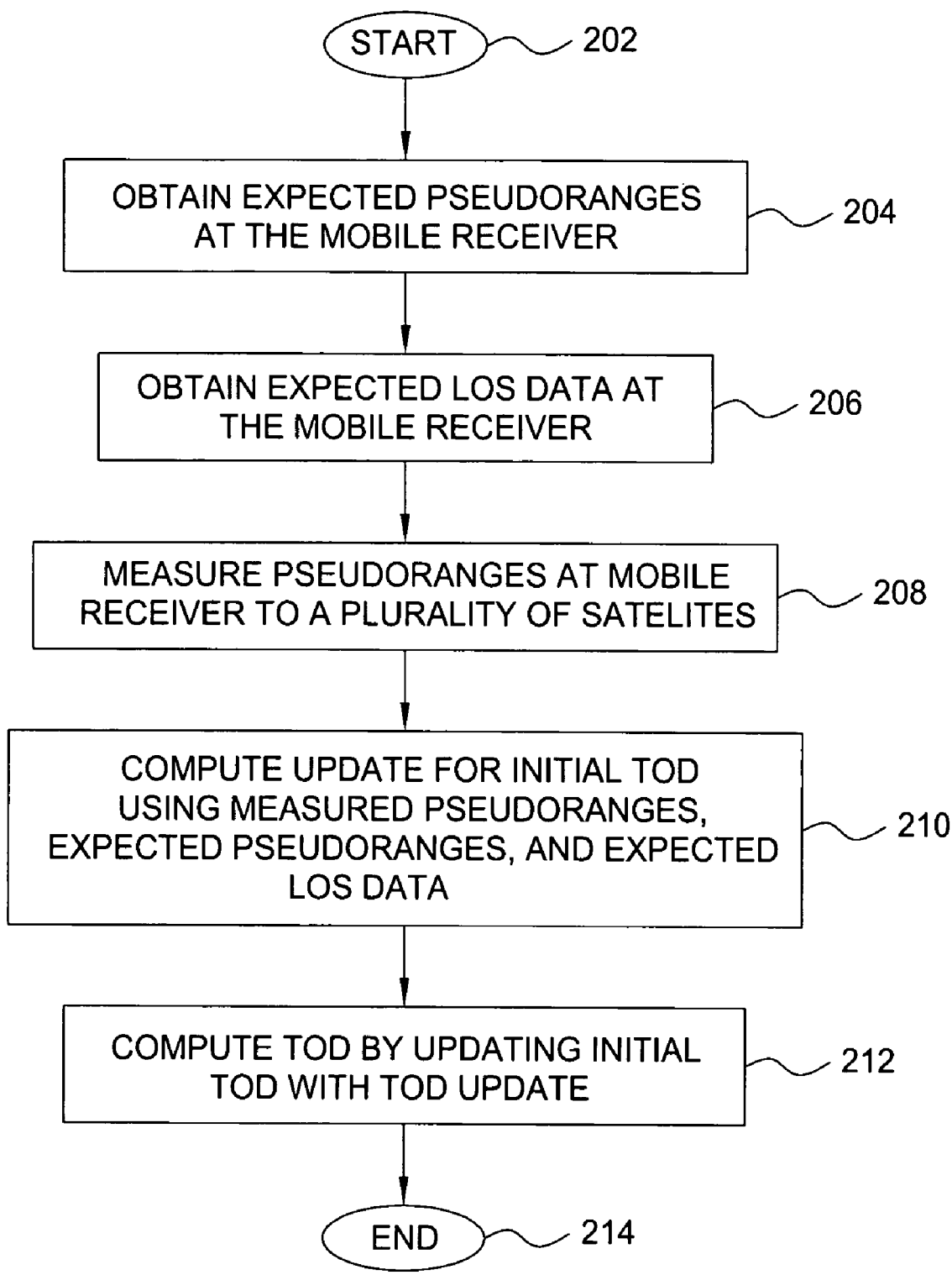
FIG. 2 is a flow diagram depicting an exemplary embodiment of a process for determining time-of-day at a mobile receiver in a satellite position location system.

FIG. 2 is a flow diagram depicting an exemplary embodiment of a process 200 for determining time-of-day at a mobile receiver in a satellite position location system. Aspects of the process 200 may be understood with reference to the position location system 100 of FIG. 1. The process 200 begins at step 202. At step 204, expected pseudoranges are obtained by the mobile receiver 102. The expected pseudoranges are based on an initial position of the mobile receiver 102 and are valid at an initial time-of-day (TOD). For example, the expected pseudoranges may be computed by the server 108 and sent to the mobile receiver 102 within acquisition assistance data.

At step 206, expected line-of-sight (LOS) data is obtained by the mobile receiver 102. The LOS data is based on an estimated position of the mobile receiver 102 at the initial TOD and may include expected azimuth and elevation data. In one embodiment, the expected LOS data may be obtained from acquisition assistance data transmitted to the mobile receiver 102 from the server 102. In this case, the expected LOS data is based on the initial position associated with the expected pseudoranges. Alternatively, the expected LOS data may be computed by the mobile receiver 102 using stored satellite trajectory data (e.g., almanac data). In this case, the mobile receiver 102 computes an approximate position using the stored satellite trajectory data. In one embodiment, the mobile receiver 102 computes an approximate position using almanac data stored within the mobile receiver 102. Given the stored satellite trajectory data and the approximate position, the mobile receiver 102 may then compute the expected LOS data. Such an embodiment is useful if the acquisition assistance data does not include expected LOS data, or if the expected LOS data within the acquisition assistance data is not known to a sufficient resolution.

At step 208, pseudoranges are measured at the mobile receiver 102 to a plurality of satellites. In one embodiment, the measured pseudoranges are sub-millisecond pseudoranges. At step 210, an update for the initial TOD is computed using the measured pseudoranges, the expected pseudoranges, and the expected LOS data. In one embodiment, a mathematical model may be formed that relates a residual difference between the actual pseudoranges and expected pseudoranges to updates of position and time states, including an update for time-of-day. Using the known residual difference data, the expected LOS data, and the initial TOD value, the mobile receiver 102 may solve for one or more of the unknown state updates, including the state update for time-of-day. One embodiment of a mathematical model that may be used is described below. At step 212, time-of-day may be computed by updating the initial TOD with the TOD update computed at step 208. For example, the time-of-day computed at step 212 may be used to calibrate the clock circuit 121 within the mobile receiver 102 that tracks time-of-day. The process 200 ends at step 214.

The process 200 may be used by the mobile receiver 102 to produce an accurate time-tag for the measured pseudoranges. The mobile receiver 102 may then send the measured pseudoranges and the time-tag to the server 108 for position location. In this manner, the mobile receiver 102 is capable of accurately determining time-of-day in position location systems that employ non-synchronized wireless networks (e.g., GSM, UMTS, PDC, etc.). Moreover, the mobile receiver 102 is capable of determining time-of-day information using only expected pseudorange data and expected line-of-sight data, which may be obtained from acquisition assistance data delivered by the server 108. If the acquisition assistance data does not have expected light-of-sight data, or expected LOS data within the acquisition assistance data is not known to a sufficient resolution, then the only additional information required is coarse satellite trajectory data, such as almanac data. In any case, the mobile receiver 102 does not require precise orbit data (e.g., ephemeris) to compute time-of-day. This is particularly useful in an MS-assisted configuration, where the only data delivered to the mobile receiver 102 is acquisition assistance information.

Figure 3:
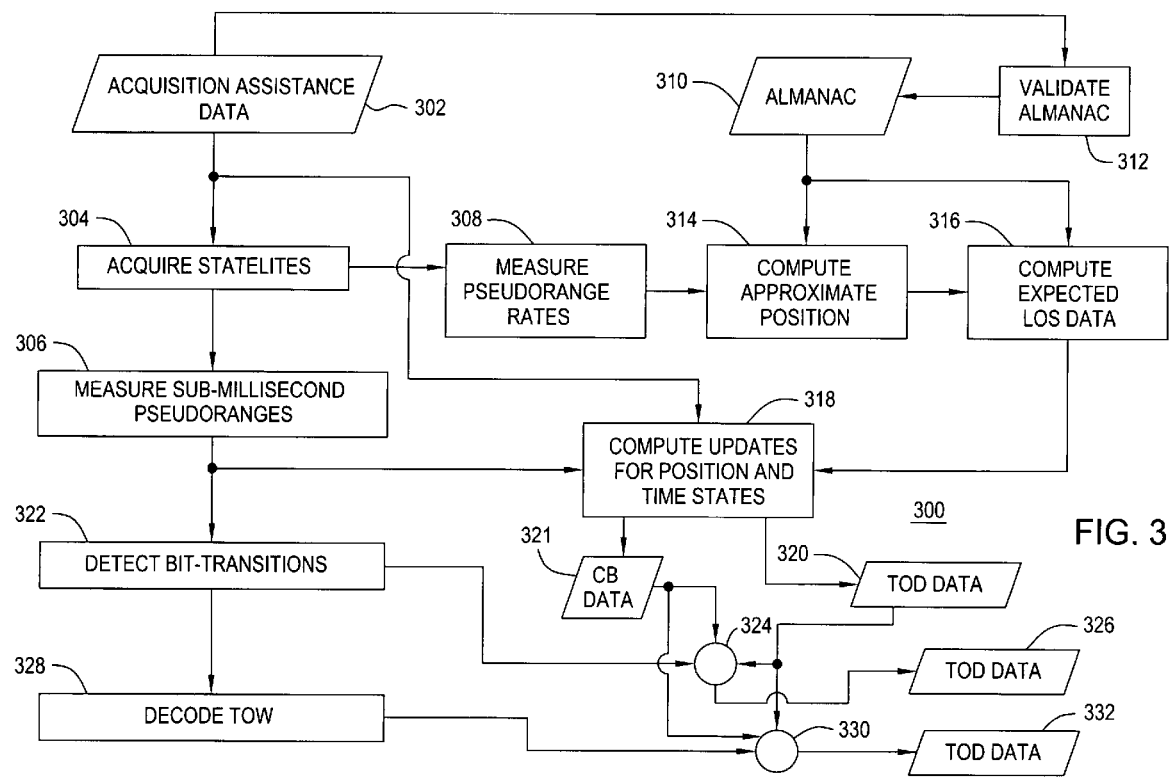
FIG. 3 is a data flow diagram depicting another exemplary embodiment of a process for determining time-of-day at a mobile receiver in a satellite position location system.

FIG. 3 is a data-flow diagram depicting another exemplary embodiment of a process 300 for determining time-of-day at a mobile receiver in a satellite position location system. Aspects of the process 300 may be understood with reference to the position location system 100 of FIG. 1. The process 300 begins with the reception of acquisition assistance data 302. As described above, the acquisition assistance 302 data may include various expected range and range-derivatives valid for an initial position and an initial time-of-day. In one embodiment of the invention, the acquisition assistance data 302 includes at least expected pseudorange data, expected pseudorange rate data (i.e., Doppler data), and the initial TOD value.

At step 304, satellite signals are acquired at the mobile receiver 102 using the acquisition assistance data 302. At step 306, sub-millisecond pseudoranges are measured at the mobile receiver 102 to a plurality of satellites using the satellite signals acquired at step 304. In addition, at step 308, pseudorange rates are measured at the mobile receiver 102 with respect to a plurality of satellites using the satellite signals acquired at step 304. The pseudorange rates may be measured by computing the difference between pseudoranges measured at a first time and pseudorange measured at a second time (i.e., the rate-of-change of the pseudoranges measured at step 306). Alternatively, the pseudorange rates may be measured by computing the difference between the nominal (L1) frequency of the satellite signal and the actual measured frequencies of the satellite signals acquired at step 304.

In the present embodiment, the acquisition assistance data 302 does not include expected LOS data to a sufficient resolution. Whether expected LOS data is deemed to have "sufficient resolution" may be defined with respect to a threshold. For example, if expected LOS data includes azimuth and elevation information having a resolution of 0.1 degrees, then the expected LOS data may be deemed to have sufficient resolution. Those skilled in the art will appreciate that other accuracy thresholds may be defined.

Notably, as defined in GSM 4.31, expected azimuth and elevation angles, if provided, are only known to a resolution of 11.25 degrees. Such a resolution will result in a large error in the TOD update computation described below, and thus the time-of-day will not be computed to a sufficient accuracy (e.g., to within approximately 10 ms). The effect of the 11.25 degree resolution may be measured by the change in the satellite geometry implied by rounding errors of half of 11.25 degrees. Satellite geometry is quantified by values known as DOPs (dilution of precision), which is well known in the art. A DOP value may change by an arbitrarily large amount when the constituent LOS vectors are changed by several degrees, and thus arbitrarily large errors in the computed TOD can result.

Returning to FIG. 3, the mobile receiver 102 may compute expected LOS data having a sufficient resolution using almanac data 310. Notably, at step 312, the acquisition assistance data 302 is used to validate the almanac data 310. For example, the acquisition assistance data may be used to remove information from the almanac data 310 associated with satellites that may have become "unhealthy" since the almanac data 310 was generated. At step 314, the almanac data 310 and the pseudorange rates computed at step 308 are used to compute an approximate position of the mobile receiver 102. In one embodiment, this may be done iteratively applying the following mathematical model:

$$\underline{u} = \begin{bmatrix} u_1 \\ \vdots \\ u_n \end{bmatrix} = \begin{bmatrix} \partial \dot{p}_1/\partial x & \partial \dot{p}_1/\partial y & \partial \dot{p}_1/\partial z & c \\ \vdots & \vdots & \vdots & \vdots \\ \partial \dot{p}_n/\partial x & \partial \dot{p}_n/\partial y & \partial \dot{p}_n/\partial y & c \end{bmatrix} \begin{bmatrix} x \\ y \\ z \\ f_c \end{bmatrix}$$

where $\underline{u}$ is the vector of pseudorange rate residuals (i.e., the difference between the measured and expected pseudorange rates), $\partial$ denotes a partial derivative, $\dot{\rho}_n$ is the nth pseudorange rate, and c denotes the speed of light. The variables x,y, and z are the updates to the a-priori position. In the present embodiment, there is no provided initial position, thus the above model may be applied with an initial position at the center of the earth and iterated until the updates converge. The variable $f_c$ is the update to the a-priori reference frequency offset in the mobile receiver 102. In one embodiment, the units of $f_c$ are seconds/second, the units of c are m/s, and the units of $\underline{u}$ are m/s. The derivation of this model is described in more detail in commonly-assigned U.S. patent application Ser. No. 10/617,559, filed Jul. 11, 2003, which is incorporated by reference herein in its entirety. Further terms, such as time-of-day offset, may be included in the above-described computation, but since only an approximate position is required (e.g. to within 10 km), it is sufficient to use approximate time-of-day in the above calculation when computing the values of $\underline{u}$ and the entries in the matrix.

The expected pseudorange rates and the matrix entries may be computed using the almanac. This leads to some errors, since the almanac is an imprecise model of the satellite orbits, but these errors are small enough to give a position within 10 km, which, as shown below, is sufficient to compute accurate line-of-sight vectors.

Using this approach, an approximate position may be computed to within approximately 10 km of the actual position of the mobile receiver 102. At step 316, expected LOS data may be computed using the approximate position and the almanac data 310 based on the initial TOD value of the acquisition assistance data 302.

Figure 5:
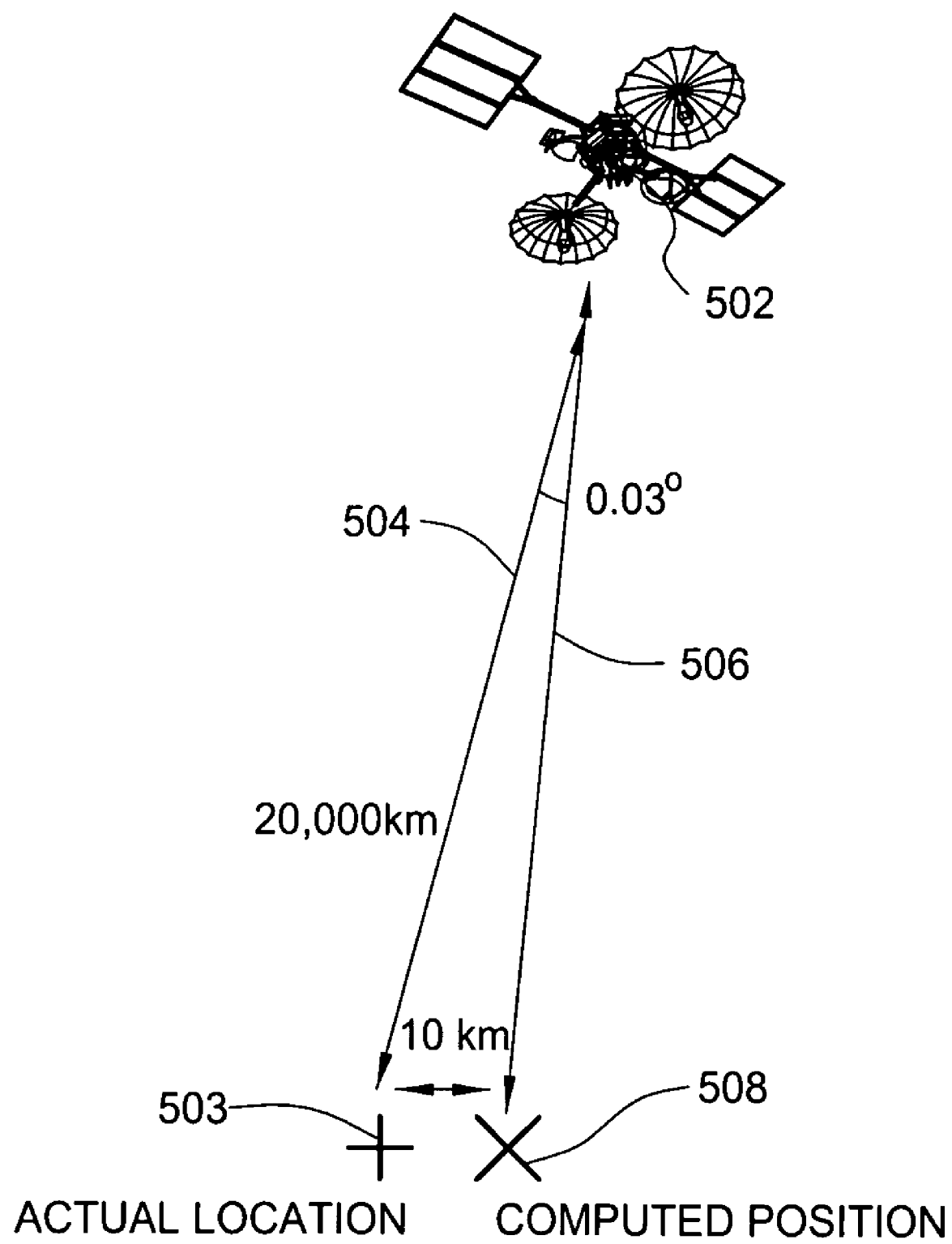
FIG. 5 graphically illustrates the effect of a 10 km position error on a line-of-sight vector to a satellite.

FIG. 5 graphically illustrates the effect of a position error of 10 km on the LOS vector to a satellite. In the present illustration, a location 503 represents the actual position of the mobile receiver. The mobile receiver is separated from a satellite 502 by a distance of 20,000 km. A vector 504 represents the actual LOS vector from the mobile receiver to the satellite 502. A location 508 represents the approximate position of the mobile receiver (e.g., computed using the almanac data and pseudorange rates, as described above). A vector 506 represents an implied LOS vector between the satellite 502 and the location 508 (e.g., an LOS vector computed at step 316). As shown, the LOS vector 506 is offset from the actual LOS vector 504 by 0.03 degrees. Compared to the LOS vector obtained from acquisition assistance data compliant with GSM 4.31, the accuracy of the LOS vector 506 is increased by two orders of magnitude.

Returning to FIG. 3, at step 318, the sub-millisecond pseudoranges measured at step 306, and the expected LOS data computed at step 316, are processed using a mathematical model to produce position and time state updates. Notably, a mathematical model may be used that relates a residual difference between the actual sub-millisecond pseudoranges and the expected sub-millisecond pseudoranges from the acquisition assistance data 302 to updates of position (e.g., x, y, and z position) and time (e.g., correlator clock bias ($t_c$) within the GPS receiver 104 and time-of-day error ($t_s$)). In one embodiment, the mathematical model may be defined as follows:

$$\underline{u} = \begin{bmatrix} u_1 \\ \vdots \\ u_n \end{bmatrix} = \begin{bmatrix} \partial \rho_1/\partial x & \partial \rho_1/\partial y & \partial \rho_1/\partial z & \partial \rho_1/\partial t_C & \partial \rho_1/\partial t_S \\ \vdots & \vdots & \vdots & \vdots & \vdots \\ \partial \rho_n/\partial x & \partial \rho_n/\partial y & \partial \rho_n/\partial z & \partial \rho_n/\partial t_C & \partial \rho_n/\partial t_S \end{bmatrix} \begin{bmatrix} x \\ y \\ z \\ t_C \\ t_S \end{bmatrix}$$

$$= \begin{bmatrix} \partial \rho_1/\partial x & \partial \rho_1/\partial y & \partial \rho_1/\partial z & c & -\dot{\rho}_1 \\ \vdots & \vdots & \vdots & \vdots & \vdots \\ \partial \rho_n/\partial x & \partial \rho_n/\partial y & \partial \rho_n/\partial z & c & -\dot{\rho}_n \end{bmatrix} \begin{bmatrix} x \\ y \\ z \\ t_C \\ t_S \end{bmatrix}$$

$$= H\underline{x}$$

where: $\underline{u}$ is a vector of pseudorange residuals (the difference between the expected sub-millisecond pseudoranges and the actual sub-millisecond pseudoranges); and the H matrix contains the well known line-of-sight vectors (first three columns) relating the position updates (x,y,z) to the pseudorange residuals; a well known column of constants (c the speed of light) relating the correlator clock bias ($t_c$) to the pseudorange residuals; and a column of range rates relating the time-of-day error ($t_s$) to the pseudorange residuals. For a detailed understanding of the above-described mathematical model, the reader is referred to commonly-assigned U.S. Pat. No. 6,417,801, issued Jul. 9, 2002, which is incorporated by reference herein in its entirety.

In some cases, the mobile receiver 102 does not have knowledge of the initial position used to form the acquisition assistance data 302. Thus, an absolute position solution for the mobile receiver 102 is not obtained at step 318, since the position updates are defined with respect to an unknown initial position. Nonetheless, time-of-day error ($t_s$) may be computed, since the initial TOD value is known (e.g., the initial TOD value may be obtained from the acquisition assistance data and tracked using the clock circuit 121 in the mobile receiver 102). An update for time-of-day may be used to update the initial TOD value within the acquisition assistance data 302 to provide TOD data 320. For example, the TOD data 320 may be accurate to within 10 ms of GPS time, since the pseudoranges are measured to an accuracy of a few meters and GPS range rates are less than 800 m/s. Notably, the above-described mathematical model shows the relationship between time-of-day error ($t_s$) and pseudorange residuals is the range rate. Hence, pseudorange accuracy of a few meters leads to a time-of-day error accuracy to a few milliseconds. The TOD data 320 may be used to calibrate the clock circuit 121 of the mobile receiver 102. Update data for clock bias ("cb data 321") within the GPS receiver 104 of the mobile receiver 102 may also be computed at step 318.

In one embodiment of the invention, time-of-day may be determined precisely (e.g., to within 1 microsecond of GPS time). Notably, at step 322, the satellite signals acquired at step 304 may be analyzed to detect bit-transitions within the 50 bit-per-second navigation data stream. As described above, the navigation data stream is modulo-2 added to the PN code that modulates the satellite signals, where the bit-boundaries are aligned with the beginning of a PN frame. There are exactly 20 PN frames per data bit period (i.e., 20 ms), and all data bits leave all satellites synchronously. At the bit-transitions, the modulo-20 value of GPS time is zero. Thus, by detecting the bit-transitions, the relative time-of-arrival of the bit edge may be determined to modulo 20 ms. Furthermore, the bit edge is measured to within the accuracy of the pseudorange (i.e., a few meters in distance or better than one microsecond when scaled by the speed of light to give time). Since the time-of-day is computed to within 10 ms at step 318, the 20 ms ambiguity may be resolved and time-of-day may be determined to better than one microsecond accuracy. An exemplary process for detecting bit-transitions is described in commonly-assigned U.S. patent application Ser. No. 10/690,973, filed Oct. 22, 2003, which is incorporated by reference herein in its entirety. At step 324, the TOD information computed at step 322 may be combined with the cb data 321 and the TOD data 320 to produce TOD data 326, which is accurate to within 1 µs.

In one embodiment of the invention, the TOD data 320 may be checked against TOW data obtained from the satellites at the mobile receiver 102 to produce precise time-of-day. Notably, at step 328 the TOW-count message may be decoded from the satellite navigation data stream using the bit-transition information from step 322. The presence or absence of a phase transition from one bit to the next provides the information data bit. If enough information data bits are determined to decode the handover word (HOW), then the TOW-count message may be decoded. The TOW-count message provides GPS time synchronized to the start of the next sub-frame of satellite navigation data. At step 330, the value of the TOW-count message may be checked against the TOD data 320 to produce TOD data 332, which is accurate to within 1 µs.

Figure 4:
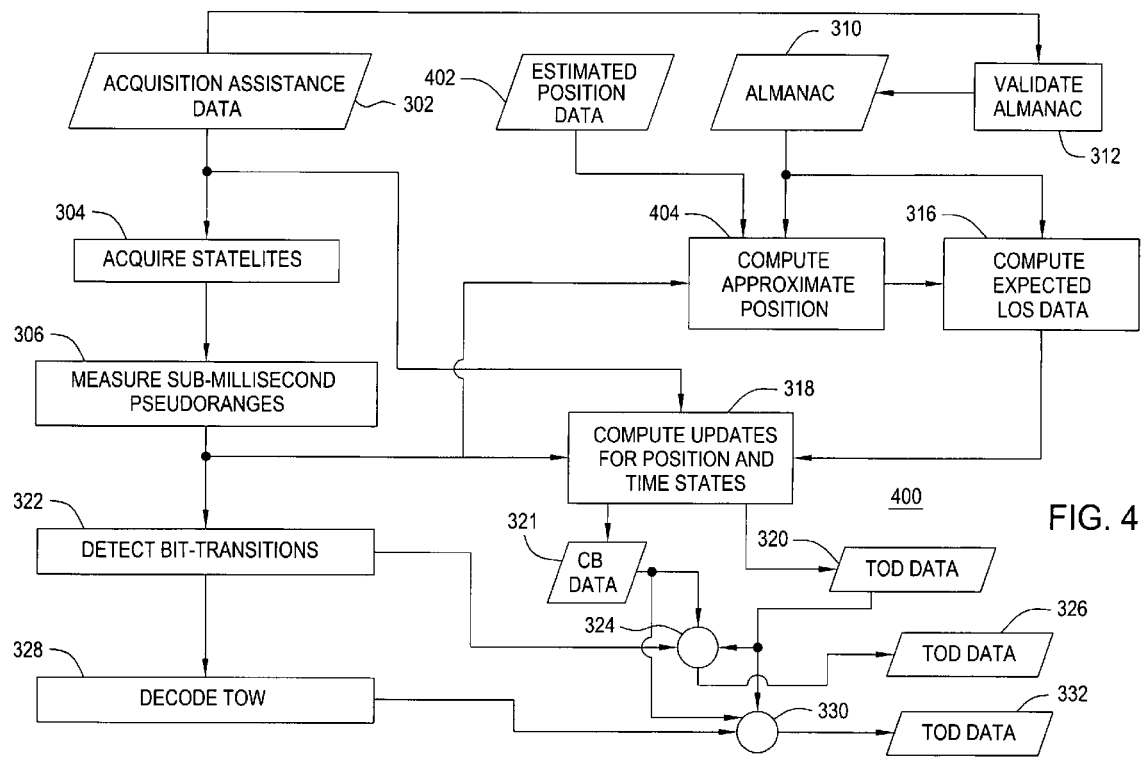
FIG. 4 is a data-flow diagram depicting yet another exemplary embodiment of a process for determining time-of-day at a mobile receiver in a satellite position location system.

FIG. 4 is a data-flow diagram depicting another exemplary embodiment of a process 400 for determining time-of-day at a mobile receiver in a satellite position location system. Elements of FIG. 4 that are the same or similar to those of FIG. 3 are designated with identical reference numerals and are described in detail above. In addition, aspects of the process 400 may be understood with reference to the position location system 100 of FIG. 1.

In the present embodiment, the mobile receiver 102 may compute expected LOS data having sufficient resolution using the almanac data 310, and estimated position data 402. For example, the estimated position data 402 may include an estimated position of the mobile receiver 102 to within 150 km of the true position. The mobile receiver 102 may obtain the estimated position data 402 from the server 108, from a recent position-fix, or using other various position estimation techniques known in the art. At step 404, the almanac data 310, the estimated position data 402, and the pseudoranges measured at step 306 are used to compute an approximate position of the mobile receiver 102. The estimated position data 402 may be used to fix the integer portion of the sub-millisecond pseudoranges, and an approximate position may be computed using the almanac in a well-known manner. For example, an approximate position may be computed to within 10 km of the actual position of the mobile receiver 102. The approximate position computed at step 404 may be used in step 316 to compute expected LOS data, as described above. Alternatively, if the estimated position data 402 is known to better accuracy (for example 10 km accuracy), then the expected LOS data may be computed directly from the estimated position data 402 without the intermediate step of computing an approximate position at step 404 using the almanac.

The above-described processes 300 and 400 not only provide accurate time-of-day, but precise relative position. Specifically, the x,y,z position updates computed at step 318 give the relative position to a precision equal to the pseudorange measurements. In typical applications of acquisition assistance, the initial position is not available to the mobile receiver 102, and so the mobile receiver 102 cannot relate this relative position to a reference. However, there is still a benefit that may be derived from the presence of precise relative positions.

In one embodiment of the invention, the mobile receiver 102 may produce a series of position fixes (i.e., multiple position computations over a period of time). By analyzing multiple position results, the relative motion of the mobile receiver 102 is known from one position fix to the next using the above-described techniques. The mobile receiver 102 may then employ various filtering techniques, such as a Kalman filtering, to process the relative positions to provide better position updates. The mobile receiver 102 may then send the improved position updates to the server 108. Alternatively, the mobile receiver 102 may synthesize pseudoranges from the improved relative positions, which may then be sent to the server 108. The server 108 can then produce a smoother position-track for the mobile receiver 102 than if the server 108 simply processed the raw pseudoranges as received from the mobile receiver 102 (as is conventionally done in MS-Assisted A-GPS systems).

In an alternative embodiment, the mobile receiver 102 may be configured to filter all of the relative positions, velocity, clock bias, and frequency bias updates to produce a smoothed track of relative positions, velocities, and clock states. The smoothed updates may be used in turn to synthesize pseudoranges that, when sent to the server 108 for processing in a least-squares manner, will produce smoothed positions.

In the preceding discussion, the invention has been described with reference to application upon the United States Global Positioning System (GPS). It should be evident, however, that these methods are equally applicable to similar satellite systems, and in particular, the Russian GLONASS system, the European GALILEO system, combinations of these systems with one another, and combinations of these systems and other satellites providing similar signals, such as the wide area augmentation system (WAAS) and SBAS that provide GPS-like signals. The term "GPS" used herein includes such alternative satellite positioning systems, including the Russian GLONASS system, the European GALILEO system, the WAAS system, and the SBAS system.

While the foregoing is directed to illustrative embodiments of the present invention, other and further embodiments of the invention may be devised without departing from the basic scope thereof, and the scope thereof is determined by the claims that follow.

The invention claimed is:

1. A method of determining time-of-day in a mobile receiver, the method comprising:

obtaining expected pseudoranges to a plurality of satellites, said expected pseudoranges based on an initial position of said mobile receiver and an initial time-of-day;

obtaining expected line-of-sight data to said plurality of satellites;

measuring pseudoranges from said mobile receiver to said plurality of satellites;

computing update data for said initial time-of-day using a mathematical model relating said pseudoranges, said expected pseudoranges, and said expected line-of-sight data;

updating said initial time-of-day using said update data to compute a time-tag; and transmitting said pseudoranges and said time-tag to a server in wireless communication with said mobile receiver.

2. The method of claim 1, further comprising receiving acquisition assistance data at said mobile receiver from a server, wherein said expected pseudoranges and said expected line-of-sight data are obtained from said acquisition assistance data.

3. The method of claim 1, wherein said computing update data for said initial time-of-day comprises: determining update data for a clock bias associated with said mobile receiver using said mathematical model.

4. The method of claim 3, further comprising:

detecting bit transitions within satellite navigation data transmitted by at least one of said plurality of satellites; and updating said initial time-of-day in response to said detected bit transitions and said clock bias update data.

5. The method of claim 1, further comprising:

detecting bit transitions within satellite navigation data transmitted by at least one of said plurality of satellites;

decoding absolute time data from said satellite navigation data in response to said detected bit transitions; and updating said initial time-of-day using said absolute time data.

6. The method of claim 5, wherein said absolute time data comprises a time-of-week count message.

7. A method of determining time-of-day in a mobile receiver, the method comprising:

obtaining expected pseudoranges to a plurality of satellites, said expected pseudoranges based on an initial position of said mobile receiver and an initial time-of-day;

obtaining expected line-of-sight data to said plurality of satellites;

measuring pseudoranges from said mobile receiver to said plurality of satellites;

computing update data for said initial time-of-day using a mathematical model relating said pseudoranges, said expected pseudoranges, and said expected line-of-sight data;

measuring pseudorange rates at said mobile receiver;

obtaining almanac data; and computing an approximate position of said mobile receiver using said pseudorange rates and said almanac data, wherein said expected line-of-sight data is obtained in response to said approximate position and said almanac data.

8. The method of claim 7, further comprising:

updating said initial time-of-day using said update data to compute a time-tag; and transmitting said pseudoranges and said time-tag to a server in wireless communication with said mobile receiver.

9. The method of claim 7, further comprising: receiving acquisition assistance data at said mobile receiver from a server, wherein said expected pseudoranges and said expected line-of-sight data are obtained from said acquisition assistance data.

10. The method of claim 7, wherein computing update data for said initial time-of-day comprises: determining update data for a clock bias associated with said mobile receiver using said mathematical model.

11. The method of claim 10, further comprising:

detecting bit transitions within satellite navigation data transmitted by at least one of said plurality of satellites; and updating said initial time-of-day in response to said detected bit transitions and said clock bias update data.

12. The method of claim 7, further comprising:

detecting bit transitions within satellite navigation data transmitted by at least one of said plurality of satellites;

decoding absolute time data from said satellite navigation data in response to said detected bit transitions; and updating said initial time-of-day using said absolute time data.

13. The method of claim 12, wherein said absolute time data comprises a time-of-week count message.

14. A method of determining time-of-day in a mobile receiver, the method comprising:

obtaining expected pseudoranges to a plurality of satellites, said expected pseudoranges based on an initial position of said mobile receiver and an initial time-of-day;

obtaining expected line-of-sight data to said plurality of satellites;

measuring pseudoranges from said mobile receiver to said plurality of satellites;

computing update data for said initial time-of-day using a mathematical model relating said pseudoranges, said expected pseudoranges, and said expected line-of-sight data;

obtaining almanac data; and obtaining an estimated position of said mobile receiver, wherein said expected line-of-sight data is obtained in response to said estimated position and said almanac data.

15. The method of claim 14, further comprising:

computing an approximate position of said mobile receiver using said almanac data and said estimated position, wherein said expected line-of-sight data is obtained in response to said approximate position and said almanac data.

16. The method of claim 14, further comprising:

updating said initial time-of-day using said update data to compute a time-tag; and transmitting said pseudoranges and said time-tag to a server in wireless communication with said mobile receiver.

17. The method of claim 14, further comprising: receiving acquisition assistance data at said mobile receiver from a server, wherein said expected pseudoranges and said expected line-of-sight data are obtained from said acquisition assistance data.

18. The method of claim 14, wherein computing update data to said initial time-of-day step comprises: determining update data for a clock bias associated with said mobile receiver using said mathematical model.

19. The method of claim 18, further comprising:

detecting bit transitions within satellite navigation data transmitted by at least one of said plurality of satellites; and updating said initial time-of-day in response to said detected bit transitions and said clock bias update data.

20. The method of claim 14, further comprising:

detecting bit transitions within satellite navigation data transmitted by at least one of said plurality of satellites;

decoding absolute time data from said satellite navigation data in response to said detected bit transitions; and updating said initial time-of-day using said absolute time data.

21. The method of claim 20, wherein said absolute time data comprises a time-of-week count message.

22. An apparatus for determining time-of-day in a mobile receiver, the apparatus comprising:

a wireless transceiver for obtaining acquisition assistance data from a server, said acquisition assistance data comprising expected pseudoranges to a plurality of satellites based on an initial position of said mobile receiver and an initial time-of-day;

a satellite signal receiver for measuring pseudoranges from said mobile receiver to said plurality of satellites;

a processor for obtaining expected line-of-sight data to said plurality of satellites and for computing update data for said initial time-of-day using a mathematical model relating said pseudoranges, said expected pseudoranges, and said expected line-of-sight data; and a clock circuit, wherein said processor is further configured to calibrate said clock circuit using said update data.

23. The apparatus of claim 22, wherein said processor is configured to obtain said expected line-of-sight data from said acquisition assistance data.

24. The apparatus of claim 22, wherein said processor is further configured to compute update data from a clock bias associated with said satellite signal receiver using said mathematical model.

25. The apparatus of claim 24, wherein said processor is further configured to detect bit transitions within satellite navigation data transmitted by at least one of said plurality of satellites and update said initial time-of-day in response to said detected bit transitions and said clock bias update data.

26. The apparatus of claim 22, wherein said processor is further configured to decode absolute time data from satellite navigation data transmitted by at least one of said plurality of satellites and update said initial time-of-day using said absolute time data.

27. The apparatus of claim 26, wherein said absolute time data comprises a time-of-week count message.

28. An apparatus for determining time-of-day in a mobile receiver, the apparatus comprising:
- a wireless transceiver for obtaining acquisition assistance data from a server, said acquisition assistance data comprising expected pseudoranges to a plurality of satellites based on an initial position of said mobile receiver and an initial time-of-day;
- a memory for storing almanac data associated with a constellation having said plurality of satellites;
- a satellite signal receiver for measuring pseudoranges from said mobile receiver to said plurality of satellites and for measuring pseudorange rates; and
- a processor for:
  - obtaining expected line-of-sight data to said plurality of satellites;
  - computing update data for said initial time-of-day using a mathematical model relating said pseudoranges, said expected pseudoranges, and said expected line-of-sight data;
  - computing an approximate position of said mobile receiver using said pseudorange rates and said almanac data; and
  - obtaining said expected line-of-sight data in response to said approximate position and said almanac data.

29. The apparatus of claim 28, wherein said processor is configured to obtain said expected line-of-sight data from said acquisition assistance data.

30. The apparatus of claim 28, wherein said processor is further configured to compute update data from a clock bias associated with said satellite signal receiver using said mathematical model.

31. The apparatus of claim 30, wherein said processor is further configured to detect bit transitions within satellite navigation data transmitted by at least one of said plurality of satellites and update said initial time-of-day in response to said detected bit transitions and said clock bias update data.

32. The apparatus of claim 28, wherein said processor is further configured to decode absolute time data from satellite navigation data transmitted by at least one of said plurality of satellites and update said initial time-of-day using said absolute time data.

33. The apparatus of claim 32, wherein said absolute time data comprises a time-of-week count message.

34. An apparatus for determining time-of-day in a mobile receiver, the apparatus comprising:
- a wireless transceiver for obtaining acquisition assistance data from a server, said acquisition assistance data comprising expected pseudoranges to a plurality of satellites based on an initial position of said mobile receiver and an initial time-of-day;
- a memory for storing almanac data associated with a constellation having said plurality of satellites;
- a satellite signal receiver for measuring pseudoranges from said mobile receiver to said plurality of satellites; and
- a processor for:
  - obtaining expected line-of-sight data to said plurality of satellites;
  - computing update data for said initial time-of-day using a mathematical model relating said pseudoranges, said expected pseudoranges, and said expected line-of-sight data;
  - computing an approximate position of said mobile receiver using an estimated position of said mobile receiver and said almanac data; and
  - obtaining said expected line-of-sight data in response to said approximate position and said almanac data.

35. The apparatus of claim 34, wherein said processor is configured to obtain said expected line-of-sight data from said acquisition assistance data.

36. The apparatus of claim 34, wherein said processor is further configured to compute update data from a clock bias associated with said satellite signal receiver using said mathematical model.

37. The apparatus of claim 36, wherein said processor is further configured to detect bit transitions within satellite navigation data transmitted by at least one of said plurality of satellites and update said initial time-of-day in response to said detected bit transitions and said clock bias update data.

38. The apparatus of claim 34, wherein said processor is further configured to decode absolute time data from satellite navigation data transmitted by at least one of said plurality of satellites and update said initial time-of-day using said absolute time data.

39. The apparatus of claim 38, wherein said absolute time data comprises a time-of-week count message.

40. A position location system, comprising:
- a mobile receiver comprising:
  - a wireless transceiver;
  - a satellite signal receiver for measuring pseudoranges from said mobile receiver to a plurality of satellites; and
  - a processor; and
- a server, in wireless communication with said mobile receiver, for transmitting acquisition assistance data to said mobile receiver, said acquisition assistance data comprising expected pseudoranges to said plurality of satellites based on an initial position of said mobile receiver and an initial time-of-day, wherein said processor is configured to obtain expected line-of-sight data to said plurality of satellites and to compute update data for said initial time-of-day using a mathematical model relating said pseudoranges, said expected pseudoranges, and said expected line-of-sight data; and wherein said wireless transceiver is configured to transmit said measured pseudoranges and said update data to said server.

41. The system of claim 40, wherein said server is configured to locate position of said mobile receiver in response to said measured pseudoranges and said update data.

* * * * *

UNITED STATES PATENT AND TRADEMARK OFFICE
CERTIFICATE OF CORRECTION

PATENT NO. : 7,245,255 B2 Page 1 of 1
APPLICATION NO. : 10/801490
DATED : July 17, 2007
INVENTOR(S) : Frank van Diggelen et al.

It is certified that error appears in the above-identified patent and that said Letters Patent is hereby corrected as shown below:

On the face page, in field (73), in "Assignee", in column 1, line 1, after "Inc" insert -- 3910 S. Bascom, Suite 260 --.

On Sheet 2 of 5, in FIG. 2 (Box No. 208), line 2, delete "SATELITES" and insert -- SATELLITES --, therefor.

On Sheet 3 of 5, in FIG. 3 (Box No. 304), line 1, delete "STATELITES" and insert -- SATELLITES --, therefor.

On Sheet 4 of 5, in FIG. 4 (Box No. 304), line 1, delete "STATELITES" and insert -- SATELLITES --, therefor.

In column 8, line 49, delete "2003," and insert -- 2003 (Attorney Docket number GLBL 027), --, therefor.

In column 10, line 38, delete "2003," and insert -- 2003 (Attorney Docket no. GLBL015P2P1), --, therefor.

In column 12, line 38, in Claim 3, after "wherein" delete "said".

Signed and Sealed this

First Day of April, 2008

JON W. DUDAS
*Director of the United States Patent and Trademark Office*